United States Patent [19]
Frankort et al.

[11] 3,822,465
[45] July 9, 1974

[54] METHOD FOR THE ULTRASONIC WELDING OF WIRES ON THE METAL SURFACE OF A SUPPORT

[75] Inventors: Martinus Petrus Carolus Gerardus Maria Frankort; Nico Arie De Gier; Aloysius Petrus Albertus Johannes Hulst; Martijn De Jong, all of Emmasingel, Eindhoven, Netherlands

[73] Assignee: U.S. Philips Corporation, New York, N.Y.

[22] Filed: Dec. 10, 1971

[21] Appl. No.: 206,715

[30] Foreign Application Priority Data
Dec. 17, 1970 Netherlands ........................ 7018377

[52] U.S. Cl. ................ 29/470.1, 29/497.5, 156/73, 228/1
[51] Int. Cl. ........................................... B23k 21/00
[58] Field of Search .......... 228/1, 3, 4, 5; 29/470.1, 29/484, 497.5, 497; 219/85, 119; 156/73

[56] References Cited
UNITED STATES PATENTS

| 3,125,803 | 3/1964 | Rich | 29/482 |
|---|---|---|---|
| 3,128,649 | 4/1964 | Avila et al. | 29/497.5 X |
| 3,263,059 | 7/1966 | Rzant | 219/119 X |
| 3,440,118 | 4/1969 | Okeda | 228/1 X |
| 3,458,921 | 8/1969 | Christensen | 29/475 X |
| 3,519,782 | 7/1970 | Mallery | 219/119 X |
| 3,662,454 | 5/1972 | Miller | 29/470.1 |

OTHER PUBLICATIONS
Balda et al., IBM Technical Disclosure Bulletin, Welding Through an Insulator, Vol. 8, No. 8, Jan. 1966, p. 1167.

Primary Examiner—J. Spencer Overholser
Assistant Examiner—Robert J. Craig
Attorney, Agent, or Firm—Frank R. Trifari; Bernard Franzblau

[57] ABSTRACT

A method of and a device for the ultrasonic welding of wires comprising a non-metal insulating layer on the metal surface of a support by means of a welding tip which is made to vibrate in a direction parallel to the longitudinal direction of a wire to be welded; according to a previously programmed welding cycle, the insulating layer is first removed locally and the wire is then welded; a preceding mechanical or chemical cleaning of the wires is not necessary. The method according to the disclosure provides a welded joint which has compact dimensions and a high mechanical strength.

8 Claims, 7 Drawing Figures

METHOD FOR THE ULTRASONIC WELDING OF WIRES ON THE METAL SURFACE OF A SUPPORT

The invention relates to a method of and a device for the ultrasonic welding of wires on the metal surface of a support, in which the wires and/or the metal surface are provided with a non-metal coating and in which a wire to be welded is positioned on the support, forced against the support and energy in the form of ultrasonic vibrations is supplied to the wire by means of a welding tip.

In such a known method, which is used for welding insulated wires, the welding tip is made to vibrate in a direction normal to the longitudinal direction of the wires. The resulting weld has a comparatively large area, approximately equal to eighteen-fold of that of the cross-section of the wire. In order to obtain a good joint, the ends of the wires to be welded are flattened. This method is suitable only for welding wires having an insulating layer of softening and deformable material, while in other universally known methods of ultrasonic welding of coated metal parts it is necessary to remove the coating by a previous mechanic or chemical treatment of the metal parts.

It is an object of the invention to provide a method of and a device for the ultrasonic welding of wires which are provided with a non-metal coating and with which a weld is obtained which is more compact than the weld obtained with the known method and which provides a joint having a high mechanical strength of the wires with the support without requiring a previous cleaning of the parts to be joined.

According to the invention this object is mainly achieved in that the welding tip is made to vibrate in a direction parallel to the longitudinal direction of the wire according to a welding cycle which is programmed so that the coating is first locally removed and the wire is then welded.

The welded joint obtained by means of the method according to the invention has a width which is smaller than twice the diameter of the wire and has an overall area approximately equal to four times the surface of the cross-section of the wire. In addition, the pull strength of the weld, in spite of the restricted area thereof, is substantially equal to 90 percent of the tensile strength of the wire. Due to the compact dimensions and the high mechanical strength of the weld, the method according to the invention satisfies particularly the special requirements which are imposed by the expanding miniaturization in the electronic industry. For example, the method may advantageously be used for welding insulated copper $x \cdot y$ wires on the matrix of an annular core memory in which the previously used soldering process presents an increasing number of difficulties, inter alia by bridge formation, by the supply of soldering flux and by the required comparatively large dimensions of the soldered joint.

A non-metal coating is to be understood to mean herein a layer which impedes welding to a considerable extent. This may be, for example, a natural or a foreign oxide layer or an insulating layer of a synthetic resin. In the method according to the invention the removal of the coating, either an oxide layer or an insulating layer, and the welding of the wire takes place during the same welding cycle so that a preceding mechanical or chemical cleaning of the surfaces to be joined is not necessary.

In a preferred embodiment of the method according to the invention, the welding cycle comprises at least one advance pulse and at least one welding pulse, the pressure force, the amplitude of the ultrasonic vibrations and the duration of the vibrating pulses being controllable. The local removal of the coating takes place during the advance pulse and the welding of the wire takes place during the welding pulse. By variation of the said parameters it is possible to adapt the welding cycle in an optimum manner to various materials of the wire, of the coating and of the support.

In another preferred embodiment of the method according to the invention the pressure force is increased and the amplitude of the vibrations reduced during the transition from the advance pulse to the welding pulse. Experiments have demonstrated that with the said variation of the pressure force and of the amplitude of the vibrations, a welded joint is obtained which is readily reproducible and in which the adjustment of the welding parameters is not critical.

For carrying out the method according to the invention a known device is used having a generator, a transducer, a waveguide, an amplitude transformer, a welding tip having a contact face and an anvil having a supporting surface. According to the invention, this device is characterized in that the welding tip can be vibrated relative to the anvil in a plane parallel to the supporting surface.

In order to obtain a good contact of the welding tip with the wire to be welded and a good energy transfer, a preferred embodiment of the device according to the invention provides a V-groove in the contact face of the welding tip, which groove extends parallel to the direction of vibration of the welding tip. This embodiment of the welding tip is particularly suitable for using circular wires having a proportionally thin coating, for example, oxidized wires.

For welding wires having a proportionally thick coating, for example, an insulating layer of synthetic resin, this welding tip is less suitable, however, because the coating is partly enclosed in the V-groove and can only be removed with difficulty. The result of this is that the coupling between the welding tip and the wire is relatively poor. In another preferred embodiment of the device according to the invention, this drawback is avoided in that the contact face of the welding tip is flat and extends parallel to the supporting surface of the anvil. Moreover, such a welding tip can advantageously be used for welding non-circular wires.

A welded article manufactured by the method according to the invention is characterized by the restricted welded area of the welded joint, by local deformation of the welded wire and by the locally removed coating.

In order that the invention may be readily carried into effect, it will now be described in greater detail, by way of example, with reference to the accompanying drawings, in which.

Figure 1:
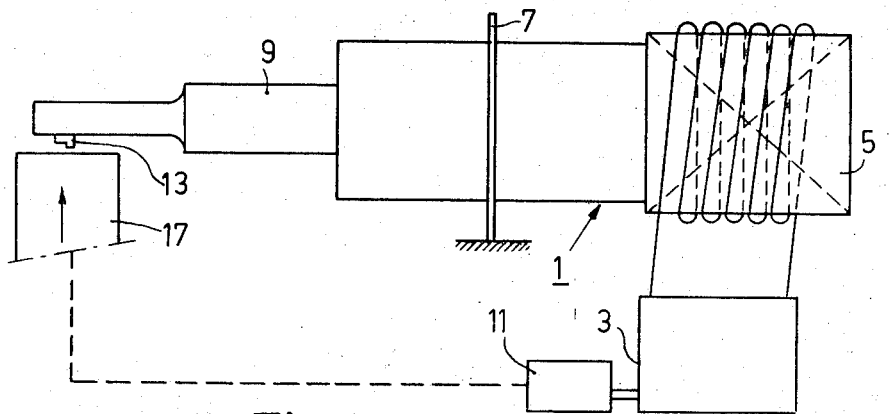
FIG. 1 shows diagrammatically a device for carrying out the method according to the invention.

The known device 1 shown in FIG. 1 for producing ultrasonic vibrations comprises a generator 3, a magnetostrictive transducer 5, a waveguide 7, an amplitude transformer 9, a control unit 11, a welding tip 13 having a contact face 15, and an anvil 17 having a supporting surface 19. The device 1 operates in a known manner. The control unit 11 serves to adjust the duration of the vibrating pulses, for example, from 0.1 to 1 sec, to adjust the amplitude of the vibrations of, for example, 0 to 10 $\mu$m, and to control the pressure force of, for example, 0 to 8 N. According to the invention this device is characterized in that the welding tip 13 can be made to vibrate in a plane parallel to the supporting surface 19 of the anvil 17. For welding a wire which includes an insulation coating onto the metal surface of a support, the latter is placed on the anvil 17 and the wire is positioned below the welding tip 13 in a manner such that the centre line of the wire extends parallel to the direction of vibration of the welding tip. The anvil 17 is then moved in the direction of the welding tip 13 until the wire is forced against the contact face 15 of the welding tip with the desired pressure force. The welding tip is ultimately made to vibrate according to a previously programmed welding cycle.

Figure 4:
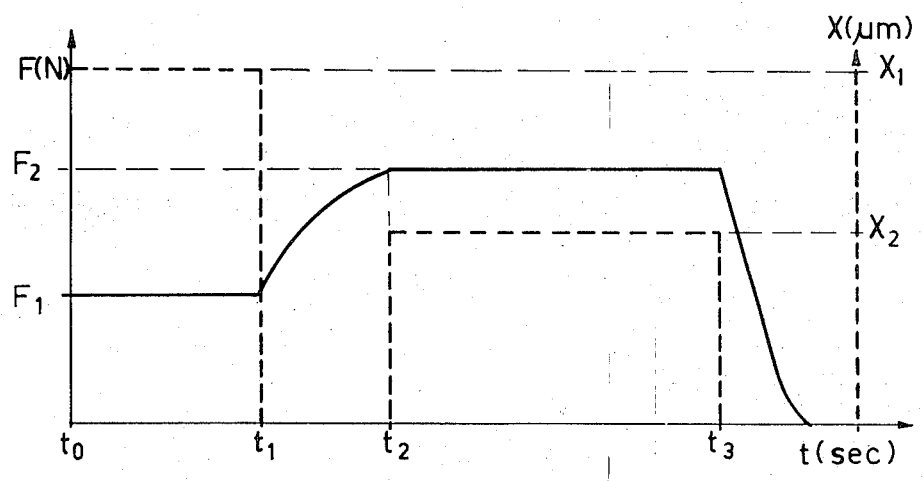
FIG. 4 shows the variation of the pressure force and of the amplitude of the vibrations during a welding cycle in accordance with time.

According to the invention, during the same welding cycle and with the same position, the coating is first locally removed by an advance pulse and the wire is then welded by a welding pulse. It has proved advantageous to adjust the apparatus to provide different welding parameters for the advance pulse and the welding pulse. FIG. 4 shows the variation of the pressure force F and of the amplitude X of the welding tip in accordance with time. For the advance pulse, during the interval $t_0 - t_1$ the pressure force F is adjusted to the value $F_1$ and the amplitude to the value $X_1$. For the welding pulse with the interval $t_2 - t_3$ the pressure force is increased to $F_2$ while the amplitude is adjusted to a lower value $X_2$.

Figures 2A, 2B:
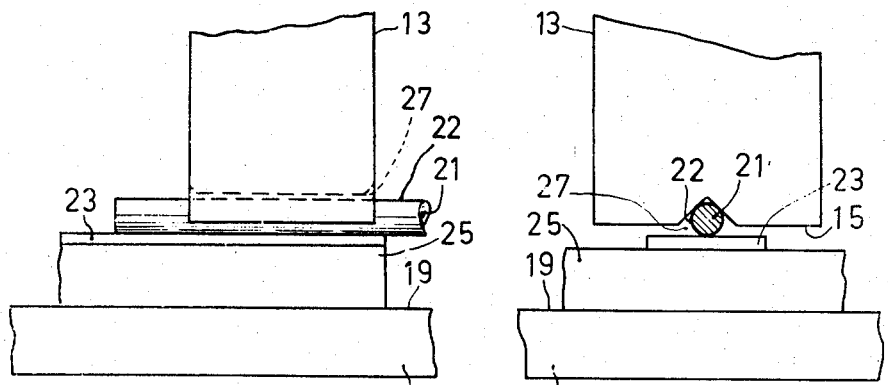
FIGS. 2a and 2b are a side elevation and a front view, respectively, of an embodiment of the welding tip on an enlarged scale.

FIGS. 2a and 2b show on an enlarged scale an embodiment of the welding tip 13 during welding of a wire 21 having an oxide layer 22 onto the metal surface 23 of a support 25. The contact face 15 of the welding tip 13 comprises a V-groove 27 the depth and the width of which are adapted to the diameter of the wire in a manner such that the welding tip cannot contact the support 25. In a welded joint performed in practice of an oxidized wire having a diameter of 80 $\mu$m, an oxide layer having a thickness of 0.1 $\mu$m and a tensile strength of $0.44.10^2$ N/m$^2$ corresponding to a pull force of 2.2 N on a printed circuit board consisting of 1.5 mm thick epoxy glass having a copper layer of 40 $\mu$, the following welding parameters were adjusted:

|  | Advance Pulse | Welding Pulse |
|---|---|---|
| time interval | 0.2 sec | 0.5 sec |
| pressure force | 2N | 5N |
| amplitude | 3 $\mu$m | 2 $\mu$m |
| overall time duration | | 1.5 sec. |

The detaching force of the resulting welded joint was 2.0 N.

Figures 3A, 3B:
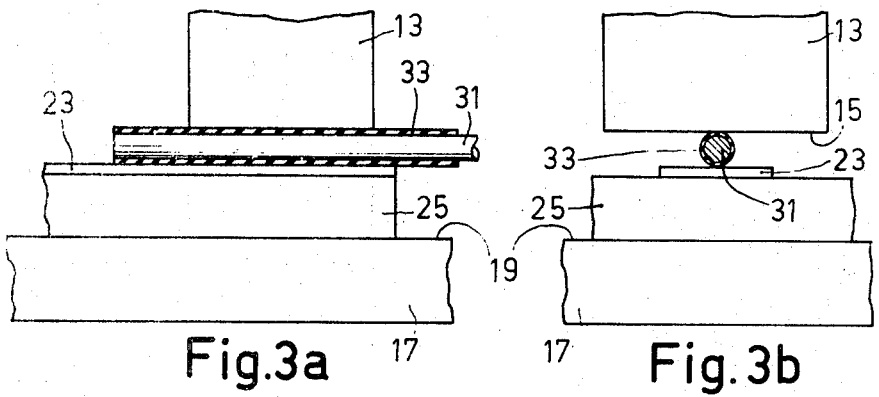
FIGS. 3a and 3b are a side elevation and a front view, respectively, of another embodiment of the welding tip.

For welding wires which are provided with insulating layer, a welding tip having a flat contact face has been found to be more suitable. FIGS. 3a and 3b show such an embodiment of the welding tip 13 during the welding of a wire 31 comprising an insulating envelope 33 in which the pressure surface 15 of the welding tip 13 is flat.

For performing experiments, a copper wire was used, diameter 63 $\mu$m, tensile strength $0.51.10^9$ N/m$^2$ corresponding to a pull force of 1.6 N, which had an 8 $\mu$m thick insulating layer consisting of a lacquer layer and a nylon envelope. The wire was welded on a printed circuit board having a 40 $\mu$m thick copper layer. The welding parameters were adjusted as follows:

|  | Advance Pulse | Welding Pulse |
|---|---|---|
| time interval | 0.15 sec | 0.5 sec |
| pressure force | 2 N | 4 N |
| amplitude | 5 $\mu$m | 2 $\mu$m |
| overall time duration | | 1.5 sec |

The detaching force of the resulting welded joint was 1.4 N.

Similar results were obtained with the following variations of the welding parameters:

|  | Advance Pulse | Welding Pulse |
|---|---|---|
| time interval | 0.1–0.2 sec | 0.3–0.7 sec |
| pressure force | 1.5–2.5 N | 2.5–5 N |
| amplitude | 3–6 $\mu$m | 1.5–3 $\mu$m |

The detaching force of the welded joints was always more than 80% of the pull force of the wire. The peeling force corresponded on average to 50% of the detaching force.

Figure 5:
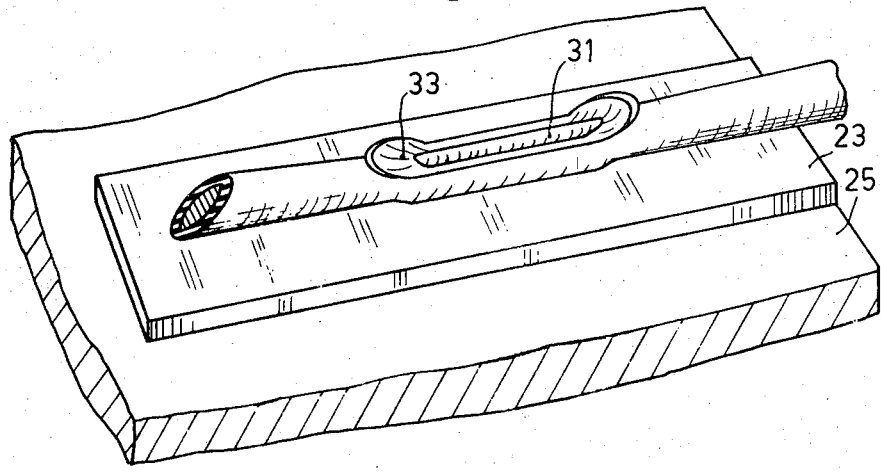
FIG. 5 is a perspective view of a welded joint for a wire comprising an insulating envelope.

A welded joint produced by the method according to the invention is characterized by the compact dimensions of the welded surface and by the deformation of the wire the thickness of which on the part of the ends covered by the welding tip decreases towards the centre to 70% of the original diameter. FIG. 5 is a perspective view of a welded joint with a wire having an insulating envelope in which the appearance of the joint is characteristic.

The metal surface on which the wire is welded may be a side of a solid metal support or the upper side of metal tracks which are provided on a non-metal substrate, for example, synthetic resin, hard paper, glass, ceramic material and other materials.

As already explained, the method according to the invention is particularly suitable for welding insulated x·y wires on the matrix of an annular core memory. The invention may furthermore be used generally for welding insulated connection wires or for producing contact connections, for example, for welding winding wire on connection lugs or pins of coils for electric motors, transformers and the like.

We claim:

1. A method of ultrasonically welding a wire element onto the metal surface of a support element, in which one of said elements is provided with a non-metal coating, said method comprising, positioning a wire to be welded on the support element and forcing the wire against the support element, supplying energy in the form of ultrasonic vibrations to the wire by means of a vibrating welding tip which is made to vibrate in a direction parallel to the longitudinal direction of the wire, and programming a welding cycle so that the coating is first locally removed by means of ultrasonic vibrations and the wire is then ultrasonically welded to the support element.

2. A method as claimed in claim 1, characterized in that the welding cycle comprises at least one advance pulse and at least one welding pulse, the pressure force, the amplitude of the ultrasonic vibrations and the duration of the vibrating pulses being controllable.

3. A method as claimed in claim 1 wherein the welding cycle comprises a first advance pulse step for removing the coating followed by a second welding pulse step for joining the wire to the support, and further comprising the step of increasing the pressure force and reducing the amplitude of the vibrations during the transition from the advance pulse step to the welding pulse step.

4. A method as claimed in claim 1 wherein said welding cycle comprises a first step for removing the coating using a first given value of pressure and a first value of amplitude vibrations followed by a second step for welding the wire to the support using a second value of pressure and a second value of amplitude vibrations.

5. A method of bonding a metal wire member to the metal surface of a support member with metal to metal contact wherein one of said members has a non-metal coating separating the two members, said method comprising, positioning the wire and support member to form a contact area between the wire and surface of the support member, forcing the wire and support together, and applying ultrasonic vibratory energy to one of said members in first and second steps to cause relative motion therebetween in a direction parallel to the longitudinal axis of the wire, said first step being of a duration to remove the coating separating the wire and support member at said contact area and the second step being of a duration to ultrasonically weld the wire to the metal surface of the support member.

6. A method as claimed in claim 5 wherein the time duration of said first and second steps are different and the compressive force between wire and support and the amplitude of vibrations each are different during said first and second steps.

7. A method as claimed in claim 6 wherein said non-metal coating covers at least a part of said metal surface of the support member and wherein the wire is positioned with its longitudinal axis parallel to said surface at said area of contact.

8. A method as claimed in claim 5 wherein said non-metal coating comprises a layer of insulation material coating the wire and that is softer than the metal wire and the weld is formed solely by means of the application of ultrasonic energy and pressure during the second step.

* * * * *